United States Patent [19]

Urairi et al.

[11] Patent Number: 5,282,965
[45] Date of Patent: Feb. 1, 1994

[54] MEMBRANE FILTER FOR LIQUIDS AND FILTERING DEVICE USING THE SAME

[75] Inventors: Masakatsu Urairi; Kenji Matsumoto, both of Osaka, Japan

[73] Assignee: Nitto Denko Corporation, Tokyo, Japan

[21] Appl. No.: 877,163
[22] PCT Filed: Nov. 29, 1991
[86] PCT No.: PCT/JP91/01676
§ 371 Date: Jul. 2, 1992
§ 102(e) Date: Jul. 2, 1992
[87] PCT Pub. No.: WO92/09357
PCT Pub. Date: Nov. 6, 1992

[30] Foreign Application Priority Data

Nov. 29, 1990 [JP] Japan .................. 2-334310

[51] Int. Cl.$^5$ .............. B01D 71/30; B01D 71/32; B01D 71/34; B01D 71/36
[52] U.S. Cl. .................. 210/500.36; 210/639; 264/41; 264/DIG. 48; 264/DIG. 62
[58] Field of Search .............. 210/639, 500.36, 500.21, 210/500.27, 500.1, 748; 264/41, 45.1, DIG. 48, DIG. 62; 55/16, 158; 427/491, 337, 400

[56] References Cited

U.S. PATENT DOCUMENTS 4,353,799 10/1982 Leonard .................. 210/321.3

FOREIGN PATENT DOCUMENTS 0242877 10/1987 European Pat. Off. .
3712491 10/1987 Fed. Rep. of Germany .
2364241 4/1978 France .
59-186604 10/1984 Japan .
198640 4/1989 Japan .

Primary Examiner—Frank Sever
Attorney, Agent, or Firm—Sughrue, Mion, Zinn, Macpeak & Seas

[57] ABSTRACT

Objects of the present invention are to provide a membrane filter for liquids which is used in microfiltration or ultrafiltration of liquids such as chemicals, water, and the like and to provide a filtering device using the membrane. The membrane is a membrane filter for liquids which has been rendered hydrophilic, in which the decrease of the pure water permeation flux of the membrane filter after being subjected to wetting treatment with a liquid having a low surface tension, subjected to replacement with pure water, and then exposed to an atmosphere of 25° C. and 60% for 8 hours, to the pure water permeation flux of the membrane filter before the exposure is 20% or less. Such a membrane filter which has been rendered hydrophilic can be obtained by, for example, rendering the surface of a PTFE porous membrane hydrophilic by treating the surface with a low temperature plasma under conditions that a product of high frequency output density and treatment time is from 0.5 to 50 W·sec/cm$^2$ and a total gas pressure is from 0.01 to 10 torr.

6 Claims, 1 Drawing Sheet

MEMBRANE FILTER FOR LIQUIDS AND FILTERING DEVICE USING THE SAME

TECHNICAL FIELD

The present invention relates to a membrane filter for liquids which is used in a microfiltration or an ultrafiltration of liquids such as chemicals and water, and to a filtering device using the membrane filter. Specifically, it relates to a membrane filter for liquids which is suitably used to filtrate chemicals for washing silicon wafers in semiconductor industries, and to a filtering device.

BACKGROUND ART

In the microfiltration or ultrafiltration treatment of liquids such as chemicals and water, fine particle-removing performance, permeation flux for liquid, resistance to chemicals, pressure resistance, heat resistance, and the like are important selection factors for membrane filter. For this reason, porous membranes comprising high molecular weight polymers such as fluororesins including polytetrafluoroethylene (hereinafter, abbreviated as "PTFE") and the like, polyethylene, polypropylene, polyolefins, and the like have conventionally been selected.

However, membranes which have been rendered hydrophilic have become more and more necessary in recent years. That is, in the semiconductor industry, for example, washing of silicon wafers is being conducted using nitric acid, hydrofluoric acid, sulfuric acid, or the like, but when replacing the chemicals after circulating and washing, air flows into the cartridge filter for filtration by discharging the chemicals. Because of this, the surface of a hydrophobic membrane such as PTFE membrane or the like in the filter comes into contact with air and the effect that the membrane has been treated with an organic solvent or the like to render the membrane hydrophilic is lost and, hence, introduction of chemicals in the next operation results in a significantly reduced liquid permeation flux.

Therefore, there has been a problem that the membrane should again be rendered hydrophilic with a liquid having a low surface tension.

On the other hand, known methods for rendering a porous polymer membrane hydrophilic include, for example, surface treatment with a plasma or sputtering, exposure to radiation, and the like (Unexamined Published Japanese Patent Applications Nos. 59-186604 and 1-98640, and others). However, such methods have had a problem that the imparted hydrophilicity is insufficient, or if a membrane is to be rendered sufficiently hydrophilic, the membrane surface is modified excessively, causing to change the rejection performance the membrane originally possesses.

DISCLOSURE OF THE INVENTION

The present invention has been completed to solve such problems of the prior art techniques. By treating the surface of a fluorine-containing porous polymer membrane with a low-temperature plasma under specific conditions, the hydrophobic membrane is enabled to retain hydrophilicity without reducing the rejection performance the membrane originally possesses, whereby a membrane filter having a significantly improved permeation flux can be obtained. The present invention provides a membrane filter for liquids which does not show a decrease in permeation flux even if the liquid in the filtering device such as cartridge filter or the like is drained away, and also provides a filtering device in which the membrane filter has been incorporated.

That is, the present invention relates to a membrane filter for liquids which has been rendered hydrophilic, characterized in that the decrease of the pure water permeation flux of the membrane filter after being subjected to wetting treatment with a liquid having a low surface tension (e.g., ethanol, methanol, isopropyl alcohol, or the like), subjected to substitution with pure water, and then exposed to an atmosphere of 25° C. and 60% for 8 hours, to the pure water permeation flux of the membrane filter before the exposure is 20% or less, preferably 10% or less.

The present invention further relates to a membrane filter for liquids, characterized in that the surface of a fluorine-containing porous polymer membrane has been rendered hydrophilic by a low temperature plasma treatment under conditions that a product of 5 to 15 MHz high frequency output treating density and treatment time is from 0.5 to 50 W·sec/cm$^2$ and a total gas pressure is from 0.01 to 10 torr.

The fluorine-containing porous polymer membrane in the present invention is a hydrophobic membrane comprising a fluororesin such as PTFE, poly(vinylidene fluoride), or the like, and PTFE is particularly preferred from the standpoints of resistance to chemicals, heat resistance, and others. Further, a membrane having a pore diameter of from 0.01 to 1 μm, particularly from 0.05 to 0.2 μm, is suitably used.

In the present invention, a hydrophilic membrane is obtained by rendering the surface of the above porous membrane hydrophilic by, for example, treating the porous membrane with a low temperature plasma under specific conditions. Such a plasma treatment is carried out by introducing a gas species ($O_2$, $H_2$, $N_2$, $H_2O$, $CO_2$, He, Ar, NO, or the like) under reduced pressure conditions, regulating the pressure generally at 0.01 to 10 torr, preferably at 0.01 to 1.0 torr, and treating the membrane at a radio frequency (5 to 15 MHz) such that the product of high frequency output treating density and treatment time becomes 0.5 to 50 W·sec/cm$^2$, preferably 1 to 10 W·sec/cm$^2$.

If this product of high frequency output treating density and treatment time is less than the above range, sufficient hydrophilicity is not imparted. On the other hand, if it is more than the range, small fibers (fibrils) in the membrane are broken and this results in a problem that the rejection performance is reduced and scattered fine particles come into permeation liquids to lower the membrane performance.

Further, total gas pressures below 0.01 torr are insufficient for membrane modification, while the pressures above 10 torr are not preferred in that an apparent plasma intensity is increased due to an increased number of gas molecules, resulting in fibril breakage.

In the treatment, if the membrane treated is directly placed on an electrode plate, there is a fear that the membrane surface is damaged and fibril breakage occurs, due to collision of accelerated electrons and charged particles. Normally, the membrane is placed at an electrode-to-membrane distance of from 1 to 20 cm, preferably from 2 to 10 cm.

It is preferable that the contact angle between the porous membrane thus rendered hydrophilic and 40 wt % ammonium fluoride aqueous solution is 120° or less.

According to the present invention, the porous membrane which has been rendered hydrophilic by the plasma treatment as described above may be used to fabricate a filtering device such as a cartridge filter produced by processing the membrane into a disk or pleated form, bonding it to a support, and incorporating it into a container, a plate-type module in which the membrane in flat form is supported by a plate and a frame, a hollow fiber membrane module, or the like.

Although the filtering device of the present invention is not particularly limited in application thereof, it can, for example, be advantageously used in the semiconductor industry as a cartridge filter for filtering washing chemicals for silicon wafers.

BEST MODES FOR CARRYING OUT THE INVENTION

EXAMPLE 1

Figure 1:
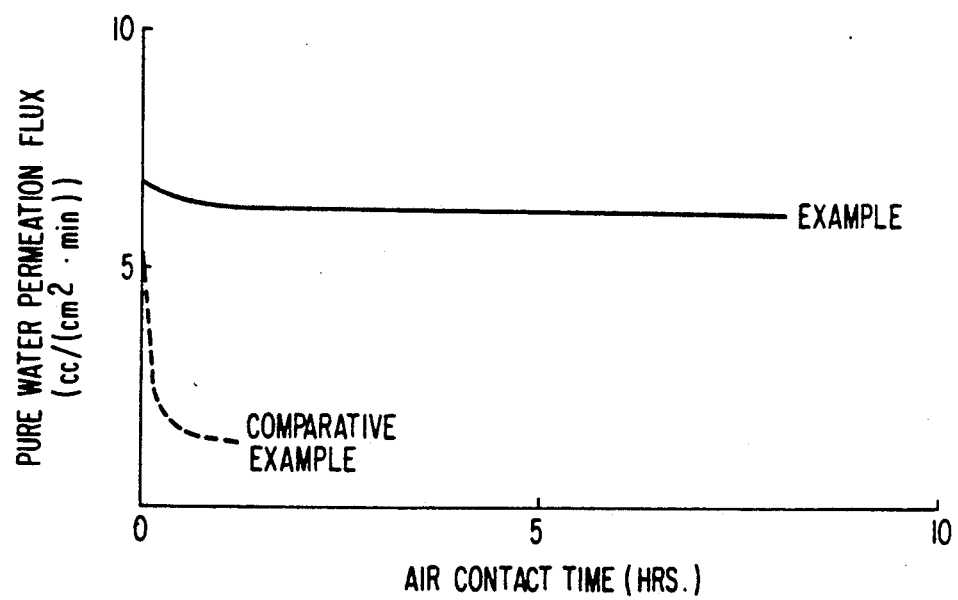
FIG. 1 is a graph showing the relationship between air contact time and pure water permeation flux.

A polytetrafluoroethylene porous membrane (manufactured by Nitto Denko Corporation; trade name, NTF 1111; nominal pore diameter, 0.1 μm) was set in a plasma irradiator in parallel with an electrode plate at a distance of 10 cm therefrom, followed by evacuation, feeding of $O_2$ gas at a flow rate of 10 cc(STP)/min, and pressure regulation at 0.02 torr. The membrane was treated at 13.56 MHz in a manner such that the product of high frequency output treating density and treatment time became 14.3 W·sec/$cm^2$, and the membrane was then taken out to obtain a membrane filter of the present invention.

The membrane was cut to 20 $cm^2$, set in a cartridge-type filtering device, and rendered hydrophilic by a treatment that about 50 cc of ethanol was passed through the membrane. Pure water was then passed, with the degree of vacuum on the downstream side being 525 mmHg, and as a result, the initial pure water permeation flux was 7 cc/$cm^2$/min.

This membrane had contact angles at 25° C. of 125° and 114° for pure water and 40 wt % $NH_4F$ aqueous solution, respectively. Before the plasma treatment, they were 126° and 132°, respectively. Further, the permeation flux for 40 wt % $NH_4F$ aqueous solution was 2.2 cc/$cm^2$/min.

Suction was further continued to remove the liquid on the membrane surface. Thereafter, the relationship between air contact time and permeation flux was determined, and the results are shown in FIG. 1.

Further, the membrane surface was analyzed by ESCA. As a result, it was ascertained that F had been eliminated and O had been incorporated. SEM examination (magnification 20,000) also revealed that there were no broken fibrils and the number of fine particles in the permeation liquid did not increase.

Further, the membrane had a latex rejection, as measured through vacuum filtration of a 10 ppm aqueous solution of a 0.102 μm latex, of 93%.

COMPARATIVE EXAMPLE 1

Initial pure water permeation flux measured in the same manner as in Example 1 except that the plasma treatment was omitted was found to be 6 cc/$cm^2$/min. The results of the change in permeation flux after contact with air are also shown in FIG. 1. Further, the latex rejection was 94%.

Further, the permeation flux for 40 wt % $NH_4F$ aqueous solution was 1.4 cc/$cm^2$/min.

Although this membrane was equal to the membrane of Example 1 in rejection performance and pure water permeation flux, the membrane of Example 1 which had undergone treatment for rending it hydrophilic showed higher permeation fluxes for high viscosity liquids such as the $NH_4F$ aqueous solution.

It can be clearly seen from FIG. 1 that the membrane filter of the present invention shows extremely good pure water permeation flux as compared with the membrane of the Comparative Example, although its latex rejection is almost the same as that of the membrane of the Comparative Example, and that the membrane filter of the present invention can retain such pure water permeation flux over a prolonged period of time even if the membrane surface is exposed to air.

EXAMPLE 2

A membrane was set in the same manner as in Example 1 and the plasma output was doubled (28.6 W·sec/$cm^2$). As a result, the resulting membrane was equal in membrane performance to the membrane of Example 1.

Further, even after contact with air, this membrane retained pure water permeation flux over a prolonged period of time, which is comparable to the membrane of Example 1.

COMPARATIVE EXAMPLE 2

The same treatment as in Example 1 was conducted except that the same membrane as used in Example 1 was placed directly on the electrode plate. As a result, the latex rejection of the membrane decreased from 93% to 10%, while the pure water permeation flux increased 1.5 times. Moreover, this membrane was examined with an SEM and, as a result, fibril breakage was ascertained.

COMPARATIVE EXAMPLE 3

A membrane was set in the same manner as in Example 1 and the product of high frequency output treating density and treatment time was reduced (to 0.3 W·sec/$cm^2$). As a result, the resulting membrane showed membrane performance comparable to that in Comparative Example 1 and the membrane was not rendered hydrophilic.

COMPARATIVE EXAMPLE 4

The same operation as in Example 1 was conducted, with the product of high frequency output treating density and treatment time being increased (to 57.2 W·sec/$cm^2$). As a result, the latex rejection decreased from 93% to 30%, while the pure water permeation flux increased 1.3 times. Moreover, this membrane was examined with an SEM and, as a result, fibril breakage was ascertained.

POSSIBILITY OF INDUSTRIAL APPLICATION

According to the present invention, since a hydrophobic membrane is enabled to retain hydrophilicity without reducing the rejection performance the membrane inherently possesses, the hydrophilicity of the membrane in a filtering device such as a cartridge filter or the like is maintained even if the device is drained after liquid permeation because the membrane surface still retains the liquid and, hence, air does never come into contact with the inner of the membrane. Therefore, a membrane filter for liquids which shows no decrease in permeation flux even after discharge of the liquid in the filtering device can be obtained.

We claim:

1. A membrane filter for chemicals which has been rendered hydrophilic comprising a fluorine-containing porous polymer;

wherein substantially only the surface of the membrane has been rendered hydrophilic by a low temperature plasma treatment under conditions that a product of 5 to 15 MHz high frequency output treating density and treatment time is from 0.5 to 50 W·sec/cm$^2$ and a total gas pressure is from 0.01 to 10 torr, and wherein the decrease in pure water permeation flux of the membrane filter, after being subjected to wetting treatment with a liquid having a low surface tension, subsequently being subjected to substitution with pure water, and then being exposed to an atmosphere of 25° C. and 60% for 8 hours, to the pure water permeation flux of the membrane filter before the exposure, is 20% or less.

2. A membrane filter for liquids as claimed in claim 1, wherein the fluorine-containing high molecular weight polymer porous membrane is a hydrophobic membrane comprising a fluororesin such as polytetrafluoroethylene, poly(vinylidene fluoride), or the like.

3. A membrane filter for liquids as claimed in claim 2, which is characterized in that the contact angle between the membrane and 40 wt % ammonium fluoride aqueous solution is 120° or less.

4. A liquid-filtering device obtained by fitting the membrane filter for liquids as claimed in claim 2 to the inside of a container.

5. A liquid-filtering device obtained by processing the membrane filter for liquids as claimed in claim 2 into a disk or pleated form, fixing the resulting membrane to a support, and fitting the supported membrane to the inside of a container.

6. A cartridge filter for filtering washing chemicals for silicon wafers comprising a liquid-filtering device as in claim 5.

* * * * *